US007676533B2

(12) United States Patent
Taunton

(10) Patent No.: US 7,676,533 B2
(45) Date of Patent: Mar. 9, 2010

(54) SYSTEM FOR EXECUTING SIMD INSTRUCTION FOR REAL/COMPLEX FFT CONVERSION

(75) Inventor: Mark Taunton, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 956 days.

(21) Appl. No.: 10/953,584

(22) Filed: Sep. 30, 2004

(65) Prior Publication Data

US 2005/0102341 A1 May 12, 2005

Related U.S. Application Data

(60) Provisional application No. 60/506,732, filed on Sep. 30, 2003, provisional application No. 60/506,487, filed on Sep. 29, 2003, provisional application No. 60/507,522, filed on Oct. 2, 2003, provisional application No. 60/506,355, filed on Sep. 29, 2003.

(51) Int. Cl.
*G06F 17/14* (2006.01)
(52) U.S. Cl. ...................................... 708/404
(58) Field of Classification Search .................. 708/404
See application file for complete search history.

(56) References Cited

U.S. PATENT DOCUMENTS

| 4,769,779 | A | | 9/1988 | Chang et al. |
|---|---|---|---|---|
| 6,377,970 | B1 | | 4/2002 | Abdallah et al. |
| 6,421,696 | B1 | | 7/2002 | Horton |
| 6,609,140 | B1 | * | 8/2003 | Greene ..................... 708/404 |
| 6,839,728 | B2 | * | 1/2005 | Pitsianis et al. ............ 708/404 |
| 6,963,891 | B1 | * | 11/2005 | Hoyle ....................... 708/404 |
| 7,197,095 | B1 | | 3/2007 | Van Wechel et al. |
| 7,197,525 | B2 | | 3/2007 | Stein et al. |
| 7,233,968 | B2 | * | 6/2007 | Kang ........................ 708/404 |
| 7,315,878 | B2 | * | 1/2008 | Han .......................... 708/404 |
| 2005/0071403 | A1 | | 3/2005 | Taunton |
| 2005/0071414 | A1 | | 3/2005 | Taunton |
| 2005/0102342 | A1 | | 5/2005 | Greene |

OTHER PUBLICATIONS

Clark, P. "Broadcom's Firepath combines RISC, DSP elements," 2 pages, printed from www.commsdesign.com/showArticle.jhtml?articleID=10808435, 2 pages (Jun. 13, 2001).

(Continued)

*Primary Examiner*—David H Malzahn
(74) *Attorney, Agent, or Firm*—Sterne, Kessler, Goldstein & Fox P.L.L.C.

(57) ABSTRACT

An FFT conversion instruction based on a single instruction multiple data ("SIMD") technique is executed to reduce the number of cycles for software to perform conversion processing used in an FFT computation. In an embodiment, the FFT conversion instruction implements two instances of a conversion operation, i.e., 2-way SIMD, over two sets of complex points at once. A control register or variant opcode controls an inverse flag to control the behavior of the conversion process. In an embodiment, the control register contains a control bit to select between forward and inverse FFT context.

18 Claims, 7 Drawing Sheets

OTHER PUBLICATIONS

Wilson, S., *Firepath™ Processor Architecture and Microarchitecture*, 24 pages, downloaded from www.hotchips.org/archives/hc14, (presented Aug. 20, 2002).

Proakis, J.G. and Manolakis, D.G., *Digital Signal Processing: Principles, Algorithms, and Applications*, Second Edition, Macmillan Publishing Company, pp. 684-760 (1992).

*Hot Chips 14 Archives (2002) General Information*, 5 pages, printed from http://www.hotchips.org/archives/hc14/, (2002).

*BCM6410/6420 Product Brief*, 2 pages, Broadcom Corporation (2003).

Office Action mailed Jan. 22, 2008 in U.S. Appl. No. 10/952,169 (File Wrapper Paper No. 20080116).

Office Action mailed May 22, 2008 in U.S. Appl. No. 10/952,169 (File Wrapper Paper No. 20080519).

Office Action mailed May 29, 2009 in U.S. Appl. No. 10/952,169 (File Wrapper Paper No. 20090527).

Office Action mailed Oct. 17, 2008 in U.S. Appl. No. 10/952,169 (File Wrapper Paper No. 20081015).

* cited by examiner

SYSTEM FOR EXECUTING SIMD INSTRUCTION FOR REAL/COMPLEX FFT CONVERSION

CROSS-REFERENCE TO RELATED APPLICATIONS

This application claims the benefit of U.S. Provisional Application No. 60/506,732, filed Sep. 30, 2003, by Taunton, entitled "SIMD Instruction for Real/Complex FFT Conversion," incorporated herein by reference in its entirety.

This application also claims the benefit of U.S. Provisional Application No. 60/506,487, filed Sep. 29, 2003, by Taunton, entitled "SIMD Instruction for Flexible FFT Butterfly," incorporated herein by reference in its entirety.

This application also claims the benefit of U.S. Provisional Application No. 60/507,522, filed Oct. 2, 2003, by Taunton et al., entitled "Processor Execution Unit for Complex Operations," incorporated herein by reference in its entirety.

This application also claims the benefit of U.S. Provisional Application No. 60/506,355, filed Sep. 29, 2003, by Taunton, entitled "SIMD Instruction for Complex Multiplication," incorporated herein by reference in its entirety.

The following United States patent applications have a common assignee and contain some common disclosure:

"Method, System, and Computer Program Product for Executing SIMD Instruction for Flexible FFT Butterfly," U.S. patent application Ser. No. 10/952,169, by Mark Taunton, filed Sep. 29, 2004, incorporated herein by reference in its entirety; and "Methods for Performing Multiplication Operations on Operands Representing Complex Numbers," U.S. patent application Ser. No. 10/951,867, by Mark Taunton, filed Sep. 29, 2004, incorporated herein by reference in its entirety.

COPYRIGHT NOTICE

A portion of the disclosure of this patent document contains material which is subject to copyright protection. The copyright owner has no objection of the facsimile reproduction by any one of the patent document or patent disclosure, as it appears in the Patent and Trademark Office patent files or records, but otherwise reserves all copyright rights whatsoever.

BACKGROUND OF THE INVENTION

1. Field of the Invention

The invention relates to a Fast Fourier Transform (FFT) and, more particularly, to single instruction multiple data (SIMD) techniques for performing real/complex FFT conversions.

2. Related Art

The Fast Fourier Transform (FFT) is a well-known algorithm, commonly used to translate between two complementary representations of sets of discrete data. The FFT is described by Proakis, J. G. & Manolakis, D. G. in *Digital Signal Processing*, New York, Maxwell Macmillan, 1992, Chapter 9, ISBN 0-02-946378, incorporated herein by reference. The FFT is commonly used in communications systems to convert between time and frequency domains, in both directions. For example, it is widely applied in the implementation of discrete multi-tone (DMT) modulation and de-modulation. An inverse FFT is used at a transmitter to convert the data values to be modulated (represented as complex amplitudes of distinct component frequencies) into a sequence of points in the time domain which will form the basis of an analog signal subsequently transmitted. At the receiver, the reverse process uses a forward FFT to recreate the frequency-domain version of the signal, which is then decoded to derive the communicated data values. The term FFT is used generically herein to refer to both forward and inverse versions of the FFT.

In older designs for transmission systems using DMT (such as digital subscriber (DSL) modems) which are in general more hardware oriented, the FFT function used both in transmitters and receivers is typically performed by fixed-function logic circuits. However, such system designs are harder to adapt for varying application requirements. For example, different versions of DSL use different numbers of frequencies and consequently different numbers of points in the time-domain, to be handled by the inverse and forward FFT functions.

While it is possible to design hardware circuits to cope with this variability, it is more complex and hence more expensive to implement. In order to increase flexibility in modem development and application, it has become more common to use software to perform the various functions in a DMT-based transmitter, receiver, or modem. As the performance levels required of such devices increase, the pressure on the software to perform efficiently the individual processing tasks (such as the FFT) which make up the overall device function likewise increases. This problem is further complicated by an increasing pressure for greater integration and performance, and therefore, more channels to be handled per processor and/or larger-sized FFT computations. As a result, it is necessary to improve the efficiency of FFT processing in such software-based DMT devices.

What are needed, therefore, are improved methods and systems for FFT processing.

SUMMARY OF THE INVENTION

The present invention is directed to methods, systems, and computer program products for performing an FFT computation. The present invention includes an FFT conversion instruction based on Single Instruction Multiple Data ("SIMD") techniques. The FFT conversion instruction reduces the number of cycles needed to perform a conversion stage during an inverse or forward FFT computation. In an embodiment, the FFT conversion instruction of the present invention is implemented such that (typically using pipelining in the processor) a new instance of the FFT conversion instruction can be initiated every processor cycle, which reduces the cost of the conversion operation for a more efficient FFT computation.

In an embodiment, the FFT conversion instruction is executed during one stage of an FFT computation that performs an inverse FFT between N "complex" frequency-domain points and 2N "real" time-domain points. First, a standard representation or standard form of complex frequency-domain data is accessed for input. The standard form of frequency-domain data includes N points of complex amplitudes of distinct component frequencies. Next, the N points of complex frequency-domain data are "converted," by executing use of the FFT conversion instruction of the present invention one or more times, into a modified data structure that includes N points of modified complex frequency-domain data. An N-point inverse FFT is performed on the N points of modified complex frequency-domain data to produce N points of complex time-domain data. Thereafter, the N points of complex time-domain data are rearranged by interleaving the N real and N imaginary data values of the complex data into a 2N-point output array which can represent purely real time-domain data values.

In another embodiment, the FFT conversion instruction is executed during one stage of an FFT computation that performs a forward FFT between 2N real time-domain points and N complex frequency-domain points. First, a 2N-point array of real time-domain data is accessed for input. Next, the 2N points of real time-domain data are allocated alternately to real and imaginary parts of an N-point FFT input data array that is considered as N points of complex time-domain data. An N-point forward FFT is performed on the N points of complex time-domain data to produce a modified data structure that includes an N-complex-point array of modified complex frequency-domain data. The modified complex frequency-domain data is then converted, by executing the FFT conversion instruction of the present invention one or more times, into a standard representation or a standard form of complex frequency-domain data.

As discussed above, the conversion operation of the present invention converts between a standard form and a modified form of complex frequency-domain data. In an embodiment, the FFT conversion instruction directly implements two instances of the FFT conversion operation (i.e., 2-way SIMD) over two sets of complex points at once. In another embodiment, the FFT conversion instruction implements one instance of the FFT conversion operation, over two complex points at once. In other embodiments, the FFT conversion instruction of the present invention can implement larger numbers of instances of the FFT conversion operation at once, for example over four or eight sets of complex points.

To control behavior of the FFT conversion instruction, a separate control register is provided to control an "inverse" flag. The control register contains a control bit that is utilized to select between forward and inverse FFT context. In another embodiment, variant opcodes are utilized to give behavioral control of the conversion operation, e.g. an FFT conversion instruction using one opcode can be used to perform a forward FFT conversion and an FFT conversion instruction using a different opcode can be used to perform an inverse FFT conversion.

Additional features and advantages of the present invention will be set forth in the description that follows. Yet further features and advantages will be apparent to a person skilled in the art based on the description set forth herein or may be learned by practice of the invention. The advantages of the present invention will be realized and attained by the structure particularly pointed out in the written description and claims hereof as well as the appended drawings.

It is to be understood that both the foregoing summary and the following detailed description are exemplary and explanatory and are intended to provide further explanation of the invention as claimed.

BRIEF DESCRIPTION OF THE DRAWINGS/FIGURES

The present invention will be described with reference to the accompanying drawings.

DETAILED DESCRIPTION OF THE INVENTION

The Fast Fourier Transform (FFT) conversion instruction of the present invention reduces the number of cycles needed to perform a conversion operation during an inverse and/or forward FFT computation using a single instruction multiple data (SIMD) technique. In an embodiment, the FFT conversion instruction is executable within a conversion stage of an FFT computation that transforms data between the frequency domain and the time domain (in either direction) within a digital signal processing environment. For example, an inverse FFT computation is executed at a transmitter to convert data values to be modulated (represented as complex amplitudes of distinct component frequencies) into a sequence of points in the time domain, which will form the basis of an analog signal subsequently transmitted. At a receiver, a reverse process uses the forward FFT computation to recreate the frequency-domain version of a received signal, which is then decoded to derive the communicated data values.

In an embodiment, the FFT conversion instruction directly implements two instances of an FFT conversion operation (i.e., 2-way SIMD) over two instances of two complex points at once. To control behavior of the conversion operation, a separate control register is provided to control an "inverse" flag. The control register contains a control bit that is utilized to select between forward and inverse FFT context. In another embodiment, variant opcodes are utilized to maintain behavioral control of the conversion operation, e.g. an FFT conversion instruction using one opcode can be used to perform a forward FFT conversion and an FFT conversion instruction using a different opcode can be used to perform an inverse FFT conversion.

Figure 1:
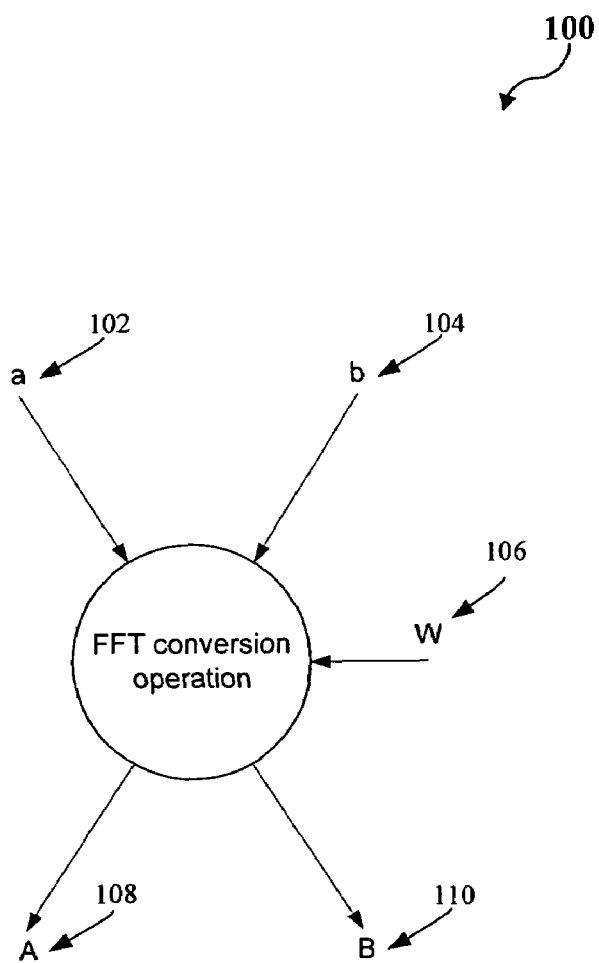
FIG. 1 is a logical representation of an FFT conversion operation.

FIG. 1 illustrates a logical representation of an FFT conversion operation 100 that translates between two representations of complex data, representing, for instance, the complex amplitudes of signals represented in the frequency domain. One or more examples of an instruction for implementing the somewhat similar "FFT butterfly" operation are described in the application entitled, "Method, System, and Computer Program Product for Executing SIMD Instruction for Flexible FFT Butterfly," U.S. patent application Ser. No. 10/952,169, by Mark Taunton, filed Sep. 29, 2004, incorporated herein by reference in its entirety.

FFT conversion operation 100 takes input values 102 and 104, which represent two complex data values a and b, respectively. FFT conversion operation 100, thereafter, combines input values 102 and 104 arithmetically with a constant value W, (shown as twiddle factor 106), and produces two output values 108 and 110, which represent two complex values A and B, respectively. In an embodiment, the complex values A and B are computed by the following Equation:

$$SumR=(a.re+b.re)/2$$

$$SumI=(a.im+b.im)/2$$

$$DiffR=(a.re-b.re)/2$$

$$DiffI=(a.im-b.im)/2$$

$$SrDi=\text{complex}(SumR, DiffI)$$

$$DrSi=\text{complex}(DiffR, SumI)$$

$$Prod=DrSi \times W$$

$$A=SrDi+Prod$$

$$B=\text{complex}(SrDi.re-Prod.re, Prod.im-SrDi.im) \qquad \text{Equation 1}$$

In Equation 1: terms a, b, W, SrDi, DrSi, Prod, A and B are all complex terms having a real part (.re suffix) and an imaginary part (.im suffix); terms SumR, SumI, DiffR and DiffI are all scalar terms; the operations +, – and / are scalar operations of addition, subtraction and division respectively; the operation + is used for both scalar and complex addition, according to whether its operands are scalar or complex respectively; the operation × is a complex multiplication; and the function complex(re,im) takes two scalar operands as parameters and produces a complex value comprising the first operand as its real part and the second operand as its imaginary part. Terms a and b are the two complex inputs, term W is the complex constant (also known as a twiddle factor) input, and terms A and B are the two complex output values, of the FFT conversion operation 100.

Note that Equation 1 is only one possible formulation of the function of the FFT conversion operation 100. The principles of the function of Equation 1 can be expressed in a number of other ways. For example, Equation 1 might be altered by some algebraic reorganization of its elements such as performing the division by 2 at earlier or later positions in the Equation, to different terms of it, or by changing the signs of the real and/or imaginary parts of the supplied constant twiddle factor W and compensating by adjustment to the corresponding elements of the equation, or by other means. It is to be understood that any other definition of the operation which produces the same values of results A and B, for any given combination of inputs a and b is, encompassed in the principles of the present invention.

In an implementation, the FFT conversion stage of an FFT computation performed using FFT conversion operation 100 of the present invention, is generally characterized (as is the FFT computation itself) by the number of data values (i.e., 102 and 104) to be processed by the stage. For a standard form of FFT computation, at each stage (including the conversion stage) N input points such as 102 and 104 (each a complex value) are transformed using N/2 conversion operations into N output points such as 108 and 110 (each also a complex value). Each FFT conversion operation 100 takes two input points and produces from them two output points. The variable N is usually specified as a power of two (i.e., of the form $2^S$, where S is a positive integer).

FFT conversion operation 100 is performed intrinsically on complex (two-dimensional) data. However, aspects of the FFT computation using the present invention are performed on purely real valued data. In many uses of FFT computation for data communications (whereas complex data is used for a frequency-domain representation of data), time-domain data is generated (by inverse FFT) or processed (by forward FFT) in a purely real (one-dimensional) form (i.e., having imaginary component values all zero). This situation occurs when for a system using N frequency domain points, the time-domain signal is one-dimensional in nature, and 2N real points are generated for transmission or processed on reception.

A "standard method" for implementing FFT computations (both forward and inverse) in such cases involves the use of a transform operating on 2N complex points. In the time domain (i.e., at the output of an inverse FFT, or the input of a forward FFT), the data values in the imaginary axis are required or assumed to be zero.

In the standard method for a forward FFT, this case is handled by setting the imaginary parts of the FFT complex input array to zero, and the real parts of the FFT complex input array to the values of 2N purely real time-domain data points to be transformed. A 2N-point forward FFT is then performed. The FFT output array, which consists of 2N complex points in the frequency domain, would automatically possess a mathematical property known as Hermitian symmetry, in which values of the upper half of the FFT output array would have a direct relationship to values in the lower half of the array. The rule is that for an array of 2N values numbered [0 . . . (2N−1)], possessing Hermitian symmetry, entry "2N-i" has a complex value equal to the complex conjugate of entry "i". Thus, since the last N output values in the FFT output array will in the case under consideration represent the complex conjugate of the first N output values, there is no additional information that can be derived from the last N output values that is not already known from the first N output values. Therefore, the first N complex frequency-domain values contain all information representing the original 2N real points of time-domain data.

For the corresponding case in the standard method for an inverse FFT, 2N real-only time-domain output points are generated from N complex frequency domain input points, by first setting the values of the first N complex elements of the input array of a 2N-point inverse FFT from the N complex input points, then forcing Hermitian symmetry in the input array by creating complex conjugate values in the upper N complex input points of the input array based on the first N input points. After the 2N-point inverse FFT is performed, the 2N imaginary parts of the complex output array (which will be generated having values that are all zero (or near-zero, given the limitations of finite-precision arithmetic in the FFT computaztion)) are discarded, and the 2N real parts of the complex output array are taken as the 2N purely-real time-domain output values of the inverse FFT.

The standard method, as described above, is not the most computationally efficient technique for performing a forward or inverse FFT between N complex frequency domain points and 2N real-only time-domain points (with N being a power of 2, i.e. of the form $2^S$ where S is a positive integer). More efficient methods are known; for example, as described in Proakis, J. G. & Manolakis, D. G. in *Digital Signal Processing*, New York, Maxwell Macmillan, 1992, Chapter 9, section 9.4.2, ISBN 0-02-946378, incorporated herein by reference. However, when compared to the more efficient method described there, the FFT conversion instruction of the present invention provides an even more efficient method for implementing FFT conversion processing, and can be executed during a conversion stage, in conjunction with an N-point FFT (rather than a 2N-point FFT, which is computationally more than twice as expensive) in either direction between N complex frequency-domain points and 2N real time-domain points.

Figure 2:
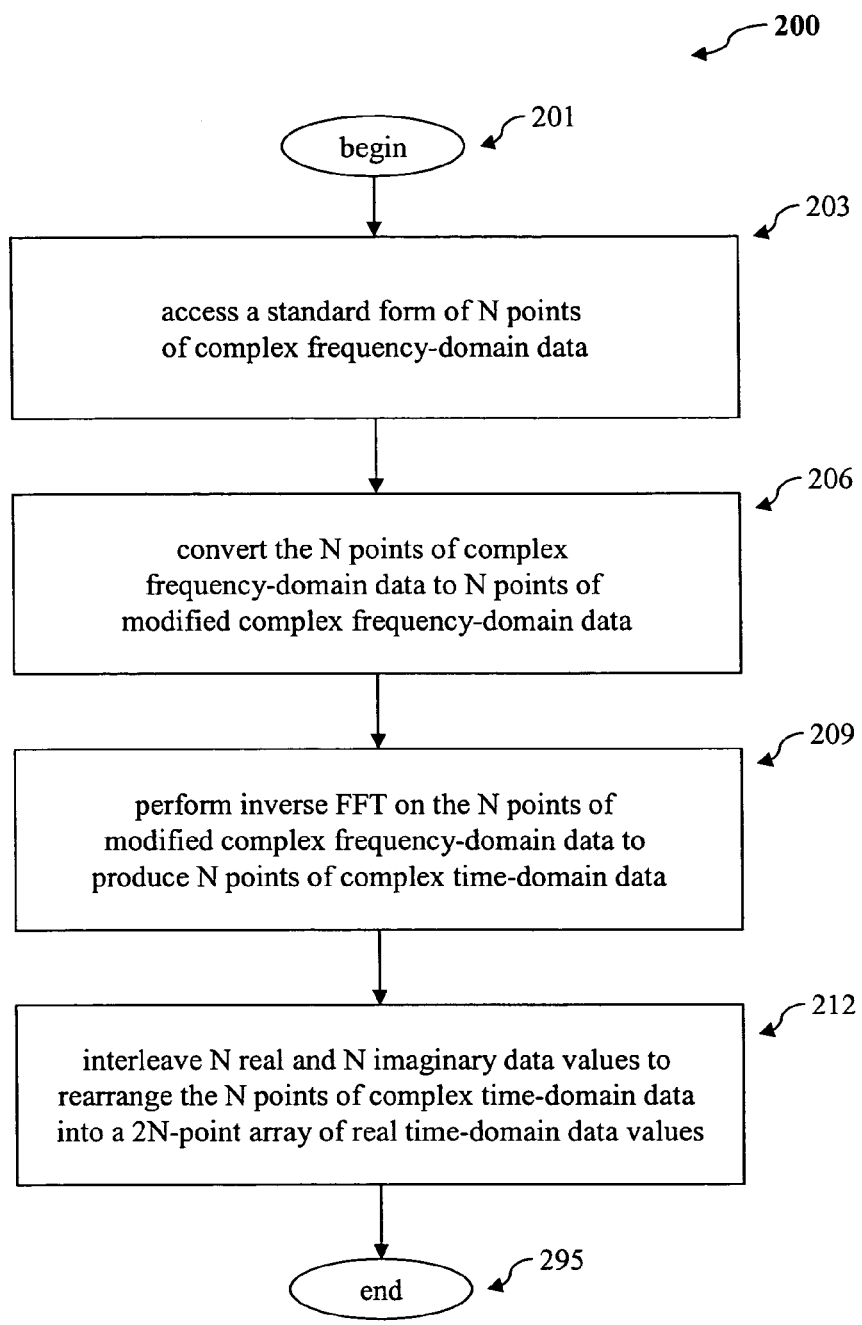
FIG. 2 illustrates an operational flow for executing an inverse FFT computation according to an embodiment of the present invention.

Referring to FIG. 2, flowchart 200 represents the general operational flow of an embodiment of the present invention. More specifically, flowchart 200 shows an example of a control flow to perform an N-point inverse transform between N complex frequency-domain points and 2N real time-domain points.

The control flow of flowchart 200 begins at step 201 and passes immediately to step 203. At step 203, a standard representation or standard form of complex frequency-domain data is accessed. The standard form of frequency-domain data includes N points of complex amplitudes of distinct component frequencies.

At step 206, the N points of complex frequency-domain data is converted to a modified data structure. The modified data structure includes N points of modified complex frequency-domain data. The FFT conversion instruction of the present invention is advantageously used to perform this conversion step.

At step 209, an N-point inverse FFT is performed on the N points of modified complex frequency-domain data. As a result, output data array is produced to include N points of complex time-domain data. In general, both real and imaginary parts of the output data array may take non-zero values.

At step 212, the N points of complex time-domain data are rearranged by interleaving the N real and N imaginary data values of the complex data into a 2N-point output array of real time-domain data values. These 2N real time-domain data values can form the basis of an analog signal that can be subsequently transmitted.

After the "N points" of incoming "complex" frequency-domain data has been transformed into a sequence of "2N points" of "real" time-domain data, the control flow ends as indicated at step 295.

Figure 3:
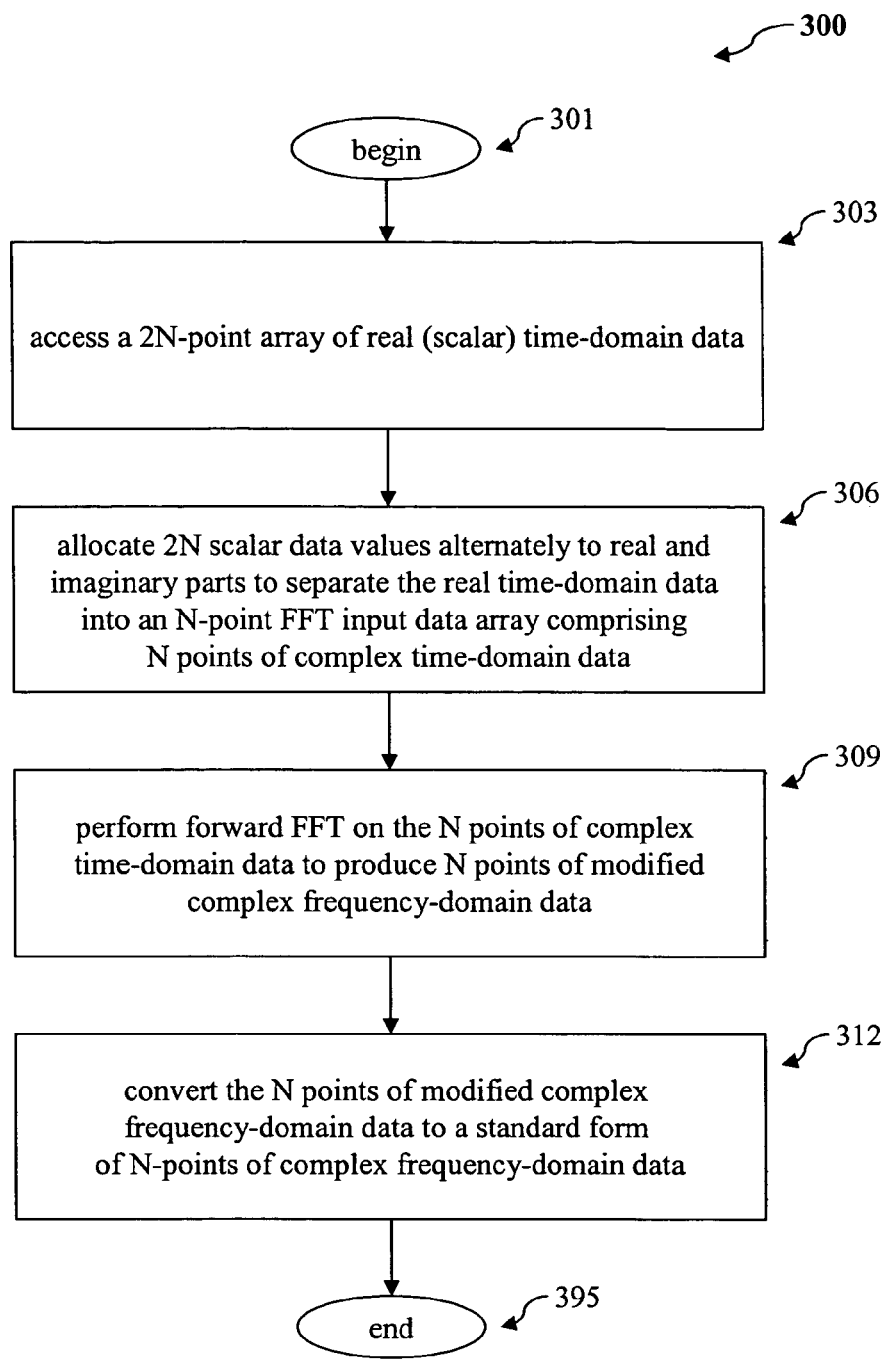
FIG. 3 illustrates an operational flow for executing a forward FFT computation according to an embodiment of the present invention.

As discussed above, flowchart 200 describes a control flow for handing an inverse transform. Referring to FIG. 3, flowchart 300 represent the general operational flow of an embodiment of the present invention for handing a forward transform. More specifically, flowchart 300 shows an example of a control flow for an N-point forward transform between 2N real time-domain points and N complex frequency-domain points.

The control flow of flowchart 300 begins at step 301 and passes immediately to step 303. At step 303, a 2N-point array of real time-domain data is accessed for input. The real time-domain data values can be recovered from an analog signal received from a communications path.

At step 306, the 2N points of real time-domain data are separated by allocating values alternately to real and imaginary parts of the complex elements of an N-point FFT input data array. As a result, the input data array would include N points of complex time-domain data.

At step 309, an N-point forward FFT is performed on the N points of complex time-domain data to produce a modified data structure. The modified data structure is an N-complex-point array of modified complex frequency-domain data.

At step 312, the modified complex frequency-domain data is converted to a standard representation or a standard form of complex frequency-domain data. The FFT conversion instruction of the present invention is advantageously used to perform this conversion step. After the 2N points of real time-domain data has been transformed into N points of complex frequency-domain data, the control flow ends as indicated at step 395.

As discussed above, step 206 in FIG. 2 and step 312 in FIG. 3 describe a conversion operation that, when executed, converts between a modified form and a standard form of elements of a complex frequency-domain data array. In an embodiment of the present invention, the conversion stage of the FFT computation, step 206 of the inverse FFT computation, or step 312 of the forward FFT computation, is described by the following pseudo code that represents the abstract function "CVT." The function "CVT" in turn uses a conversion step "CVT_step" to convert two complex input values (such as, input values 102 and 104) into two complex output values (such as, output values 108 and 110). The function identified as conversion step CVT_step is one representation of the FFT conversion operation 100 of the present invention, as may be seen by comparison of it with Equation 1.

```
FUNCTION CVT:
    CVT(in[N],out[N], inverse) {
        for m = 0..N/2 {
            angle = 2π m / (2N)
            W.re = −sin(angle)
            W.im = cos(angle)
            ix = m
            if (m = 0) iy = 0 else iy = N − ix
            CVT_step (in[iy], in[ix], W, out[iy], out[ix], inverse)
        }
    }
    CVT_step (in1, in2, w, out1, out2, inverse) {
        SumR = (in1.re + in2.re)/2
        SumI = (in1.im + in2.im)/2
        DiffR = (in1.re − in2.re)/2
        DiffI = (in1.im − in2.im)/2
        if (inverse) {
            ProdR = (DiffR * w.re) + (SumI * w.im)
            ProdI = (SumI * w.re) − (DiffR * w.im)
        } else {
            ProdR = (DiffR * w.re) − (SumI * w.im)
            ProdI = (SumI * w.re) + (DiffR * w.im)
        }
        out1.re = SumR + ProdR
        out1.im = ProdI + DiffI
        out2.re = SumR − ProdR
        out2.im = ProdI − DiffI
    }
```

The following observations can be noted from the above CVT function. When "m" is zero and also when "m" is equal to N/2, the computation has redundant elements since "ix=iy" and so the same result is produced twice. The parameters "in[N]" and "out[N]" are arrays of N complex values. The notation "val.re" refers to the real part of the complex value "val". Likewise, the notation "val.im" refers to the imaginary part of "val". The parameter "inverse" is a logical control value that indicates whether the CVT function is being used as part of an inverse FFT (when true) or an forward FFT (when false). In an embodiment, the functions "sin" and "cos" used above can be replaced by a look-up into a table of constants for the particular value of angle, as determined by the index "m". The arithmetic mode implied in the CVT function is as arbitrary real numbers (e.g., the "sin" and "cos" values are all real, between −1 and 1). Fixed point or floating point arithmetic can be used.

Figure 4:
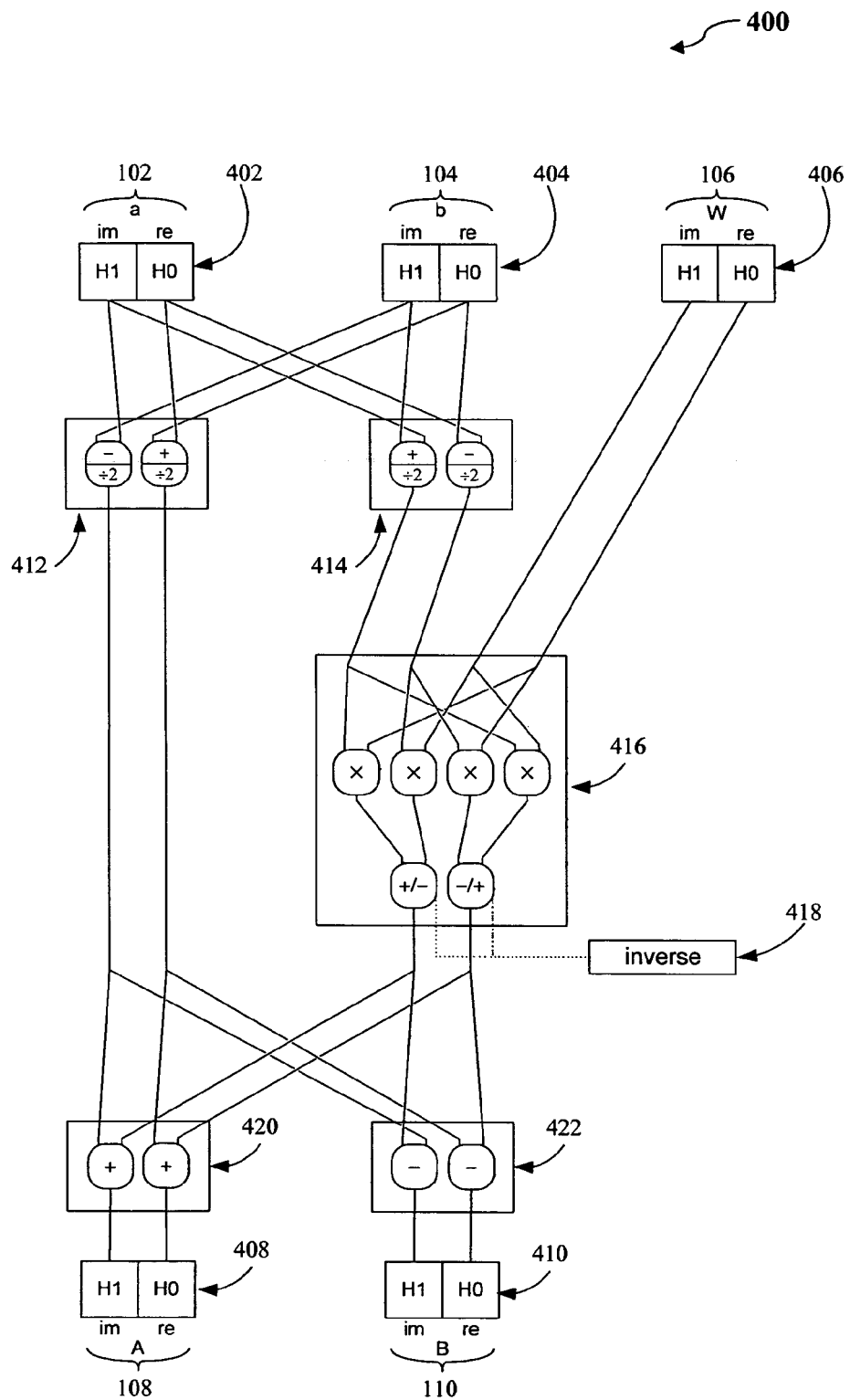
FIG. 4 illustrates data flow in the execution of a conversion operation to convert between a modified form and a standard form of complex frequency-domain data, according to an embodiment of the present invention.

Referring to FIG. 4, data flow diagram 400 represents the operational data flow of an embodiment of the present invention for implementing a conversion operation, (as also described by the above CVT_step function), executed to convert between a modified form and a standard form of a pair of complex frequency-domain data values. Note that in FIG. 4, the direction of data flow is not shown explicitly by means of arrows; instead the direction of data flow is to be understood as generally downwards from inputs at the top of the diagram to outputs at the bottom of the diagram.

Data flow diagram 400 has a set of two complex input data points, the input values 102 and 104 of FFT conversion operation 100, also identified as a and b in Equation 1. Additionally it has a twiddle factor input 106, identified as W in Equation 1. Input values 102 and 104 are represented in operands 402 and 404 respectively, and twiddle factor input 106 is represented in operand 406. Each of the input operands 402, 404 and 406 is comprised of a real part (re) and imaginary part (im), located within the operand as the H0 and H1 fields respectively. Note that this is only one possible ordering of the fields and other arrangements are possible.

As discussed above with reference to FIG. 2 and FIG. 3, the input data points are complex frequency-domain data values represented in either standard form if an inverse FFT will be performed, or modified form if a forward FFT will be performed. In an embodiment, the parameter "inverse" 418 determines the direction of the transform and, hence, the form (i.e., modified or standard) of the input data points, as described in the above CVT function.

Returning to FIG. 4, at adder/subtracter 412, the real parts of the input operands 402 and 404 are added together and divided by 2 to produce a sum of real parts (SumR of Equation 1), and the imaginary parts of the input operands 402 and 404 are subtracted and the result divided by 2 to produce a difference of imaginary parts (DiffI of Equation 1). The output of the adder/subtracter unit 412 is a complex value (SrDi of Equation 1), comprising the sum of real parts SumR as its real part and the difference of imaginary parts DiffI as its imaginary part. At subtracter/adder unit 414, the real parts of the input operands 402 and 404 are subtracted and the result divided by 2 to produce a difference of real parts (DiffR of Equation 1), and the imaginary parts of the input operands 402 and 404 are added and the result divided by 2 to produce a sum of imaginary parts (SumI of Equation 1). The output of the subtracter/adder unit 414 is a complex value (DrSi of Equation 1), comprising the difference of real parts DiffR as its real part and the sum of imaginary parts SumI as its imaginary part.

Next in data flow diagram 400, at complex multiplier unit 416, the complex value DrSi is multiplied by the complex twiddle factor operand 406, yielding as result another complex value, the product (Prod of Equation 1). As previously discussed, FFT conversion operation 100, as represented in data flow diagram 400, can be utilized during a conversion stage of a forward or inverse FFT, to convert between a standard form and a modified form of complex frequency-domain data. The direction of the transform in which the FFT conversion stage is used determines whether the conversion products are computed by accepting inputs in a modified form to produce outputs in a standard form or accepting inputs in a standard form to produce outputs in a modified form. As discussed above with reference to FIG. 2 and FIG. 3, the conversion operation is configured to produce a modified form for an inverse FFT, and a standard form for a forward FFT. In order to configure the function of the FFT conversion operation for the appropriate direction of transform, a signal 418 "inverse" is used; this is applied as a control signal to the complex multiplier unit 416. Its effect is that signal 416 is inactive ("not inverse"), the complex multiplier 416 performs a standard complex multiplication of the complex operand DrSi by the complex twiddle factor operand 406; when the signal 418 is active ("inverse"), the complex multiplier 416 performs a complex multiplication equivalent in effect to multiplying complex operand DrSi by the complex conjugate of complex twiddle factor operand 406. In an embodiment, the complex multiplication with optional conjugation of one operand is performed as described in U.S. Provisional Application No. 60/506,355, filed Sep. 29, 2003, by Taunton, entitled "SIMD Instruction for Complex Multiplication," incorporated herein by reference in its entirety, or in U.S. patent application Ser. No. 10/951,867, filed Sep. 29, 2004, by Taunton, entitled "Methods for Performing Multiplication Operations on Operands Representing Complex Numbers," incorporated herein by reference in its entirety.

At adder unit 420, a complex addition takes place; the complex value SrDi from adder/subtracter unit 412 is added to the complex product Prod from complex multiplier unit 416. The complex value resulting from this complex addition forms the first complex output operand 408 (comprised of real part in field H0 and imaginary part in field H1), representing complex output value A 108 (A) of the FFT conversion operation 100.

At subtracter unit 422, a modified form of complex subtraction takes place; it should be noted that this is not a simple complex subtraction of the two terms SrDi and Prod, as might be expected. Rather it is modified in that the real part of Prod (Prod.re) is subtracted from the real part of SrDi (SrDi.re, also known as SumR), but the imaginary part of SrDi (SrDi.im, also known as DiffI) is subtracted from the imaginary part of Prod (Prod.im), rather than the other way which would be the case for a "normal" complex subtraction of Prod from SrDi (the output of the modified complex subtraction is effectively the complex conjugate of the output of a normal complex subtraction). The complex value resulting from this modified complex subtraction operation forms the second complex output operand 410 (comprised of real part in field H0 and imaginary part in field H1), representing complex output value B 110.

Note that the ordering of the fields within the output operands 408 and 410, namely that the real part is least significant field H0 and the imaginary part is most significant field H1, is the same as for the input operands 402, 404 and 406. Note also that, this is only one possible example ordering of the fields and other arrangements are possible.

Figure 5:
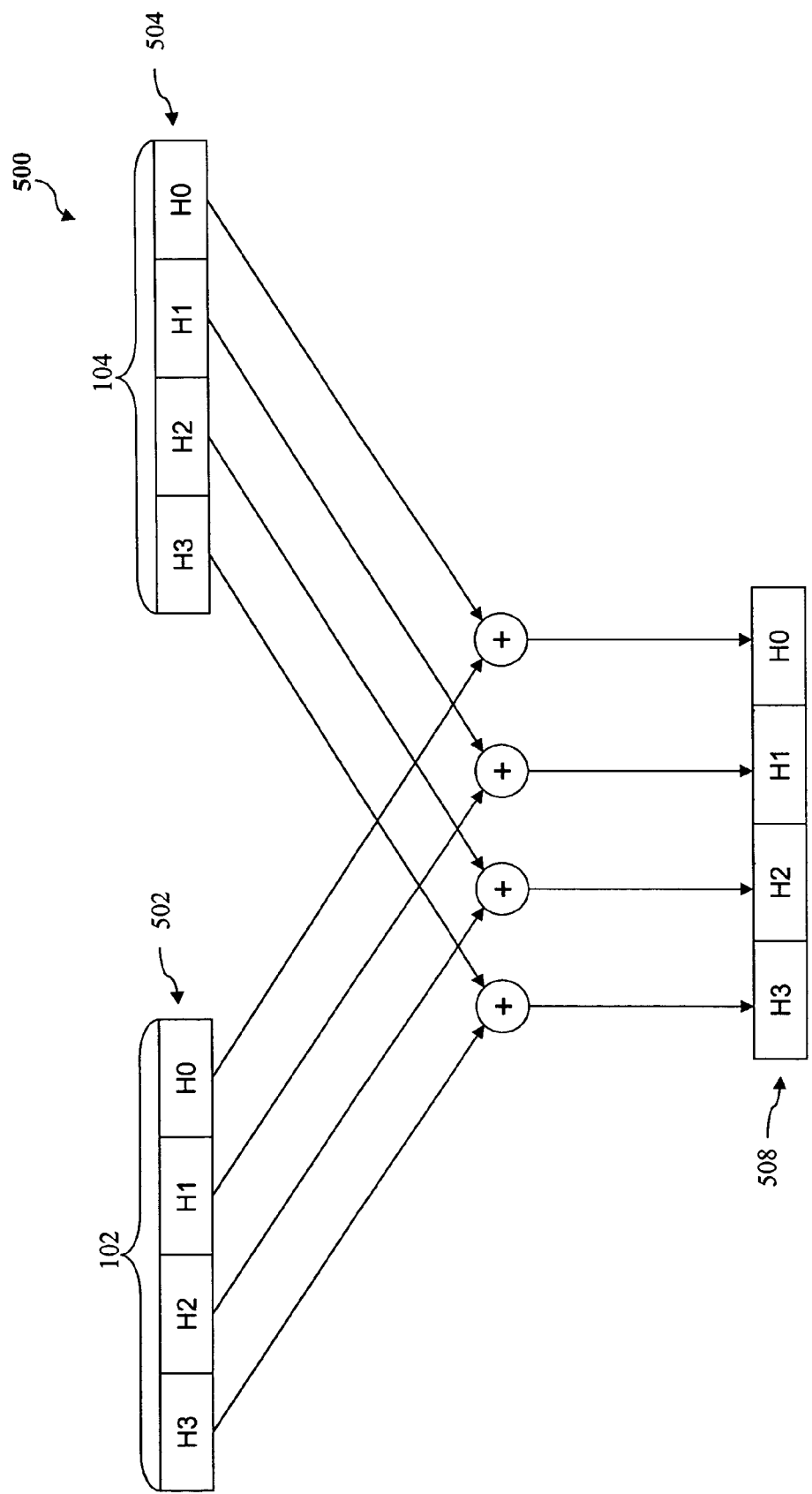
FIG. 5 is a logical representation of a four-way SIMD implemented addition of halfword data values.

A SIMD digital processor can execute a single instruction to control the processing of multiple data values in parallel. To illustrate the principles of SIMD working, refer to FIG. 5, and consider the following instruction that is executable on the FirePath™ digital processor produced by Broadcom Corporation (Irvine, Calif.):

ADDH c, a, b

The instruction mnemonic ADDH is an abbreviation for "ADD Halfwords", where a halfword is the term used for a 16-bit quantity on the FirePath™ processor. The instruction "ADDH c, a, b" takes as input two 64-bit operands 502 (i.e., "a" in the instruction) and 504 (i.e., "b" in the instruction), and writes the results back to a 64-bit operand 506 (i.e., "c" in the instruction). ADDH performs four 16-bit (halfword) additions: the value in each 16-bit lane (shown as H0, H1, H2, and H3) in input register 502 is added to the corresponding value in each 16-bit lane (shown as H0, H1, H2, and H3) in 504 to produce four 16-bit results (shown as H0, H1, H2, and H3) in output register 506, which is a 64-bit register.

The above-described SIMD method allows for a great increase in computational power compared with earlier types of processors where an instruction can only operate on a single set of input data values (e.g., one 16-bit operand from input register 502, one 16-bit operand from input register 504, giving one 16-bit result in output register 506). For situations—common in digital signal processing applications—where the same operation is to be performed repeatedly across an array of values, the above-described SIMD method allows a significant speed-up. In the above example, the speed-up is by a factor of four in the basic processing rate, since four add operations can be performed at once rather than only one.

Figure 6:
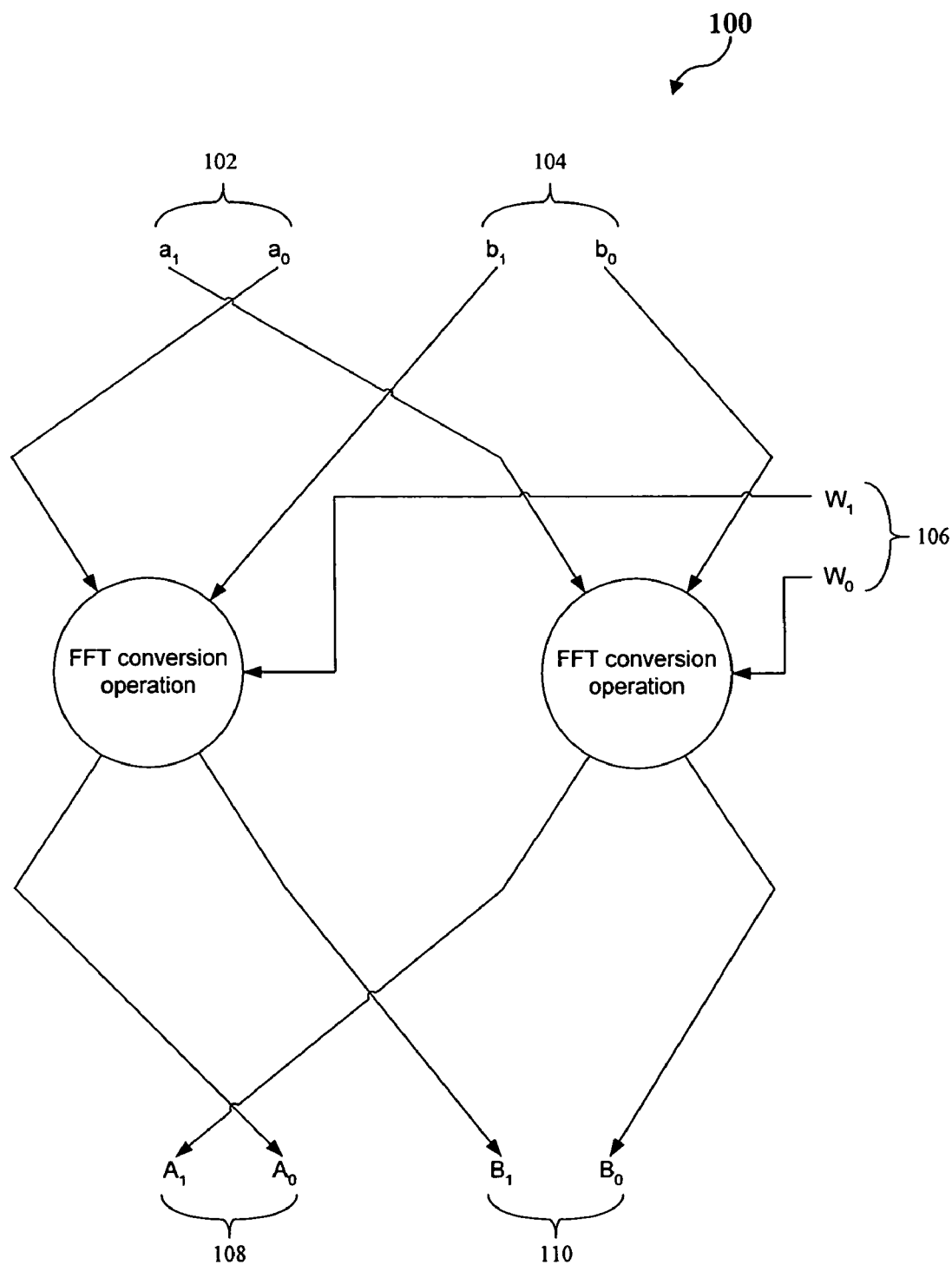
FIG. 6 is a logical representation of a 2-way SIMD FFT conversion operation

According to an embodiment of the present invention, a SIMD processor performs FFT conversion operation 100 to process multiple input values 102 and 104 along parallel pipelines. FIG. 6 illustrates a 2-way SIMD form of FFT conversion operation 100. By comparison of FIG. 6 with FIG. 1, the extension of the basic FFT conversion operation to 2-way SIMD working will be apparent. In FIG. 1, FFT conversion operation 100 takes a first complex input value a 102 and combines it with a second complex input value b 104, using a twiddle factor input value W 106, to produce complex output values A 108 and B 110. Returning to FIG. 6, the 2-way SIMD version of FFT conversion operation 100 has two instances of each input and output complex value. Thus, the complex input value a 102 is subdivided into two complex input values $a_0$ and $a_1$, the complex input value b 104 is subdivided into two complex input values $b_0$ and $b_1$, the twiddle factor value W 106 is subdivided into two twiddle factor input values $W_0$ and $W_1$, complex output value A 108 is subdivided into two complex output values $A_0$ and $A_1$, and complex output value B 104 is subdivided into two complex input values $B_0$ and $B_1$.

Referring to Function CVT above and to FIG. 6, a notable feature of the present invention concerns the ordering of the individual complex values within each 2-way SIMD input and output complex value operand. Observe in FIG. 6 that the order of combination of the individual complex values in input a 102, b 104 and W 106, to produce outputs A 108 and B 110 is not trivially parallel (combining $a_0$, $b_0$, and $W_0$ to produce $A_0$, and combining $a_1$, $b_1$, and $W_1$ to produce $A_1$) as might be expected with normal SIMD working. Instead, the first instance of FFT conversion operation 100 takes as inputs $a_0$, $b_1$, and $W_1$, producing outputs $A_0$ and $B_1$, and the second instance takes as inputs $a_1$, $b_0$ and $W_0$, producing outputs $A_1$ and $B_0$. The reason for this will become clear by reference to function CVT above. The individual FFT conversion operation 100 applied, during an iteration k, combining in[k] and in[N−k] to produce out[k] and out[N−k] is assumed to be combined in SIMD fashion with the FFT conversion operation applied during iteration k+1, which combines in[k+1] and in[N−k−1] to produce out[k+1] and out[N−k−1]. For maximum efficiency of handling of data in the arrays in[ ] and out[ ], when processed in SIMD manner, it is necessary that consecutive input points in[k] and in[k+1] appear in that order in one operand (e.g., input data operand b 104), and consecutive input points in[N−k−1] and in[N−k] appear in that order in another operand (e.g., input data operand 102). The array indices used to identify the individual complex values increase in the same direction for both operands (e.g., the two input complex values in each data operand 102 and 104 in FIG. 6), despite the required combination of the values in a different order by the execution of the FFT conversion instruction. This is made possible because the execution unit that implements the 2-way SIMD FFT conversion instruction, itself performs the appropriate reordering, as indicated in FIG. 6. Likewise, the individual complex values in the output operands (e.g., output operands 108 and 110) are similarly re-ordered. In this way, efficiency of use of the FFT conversion instruction is increased because no further instructions are needed to put the values into the right order beforehand or afterwards.

The FFT conversion instruction of the present invention, including the FFT conversion operation 100, can be executed in multiple pipelines on a SIMD microprocessor, such as the FirePath™ processor produced by Broadcom Corporation (Irvine, Calif.) and implemented in devices such as the BCM6510 and BCM6411 chips produced by Broadcom Corporation. One or more examples of a SIMD execution unit that is useful for implementing the present invention are described in the application entitled "Processor Execution Unit for Complex Operations" (U.S. Patent App. Ser. No. 60/507,522), which is incorporated herein by reference as though set forth in its entirety.

Figure 7:
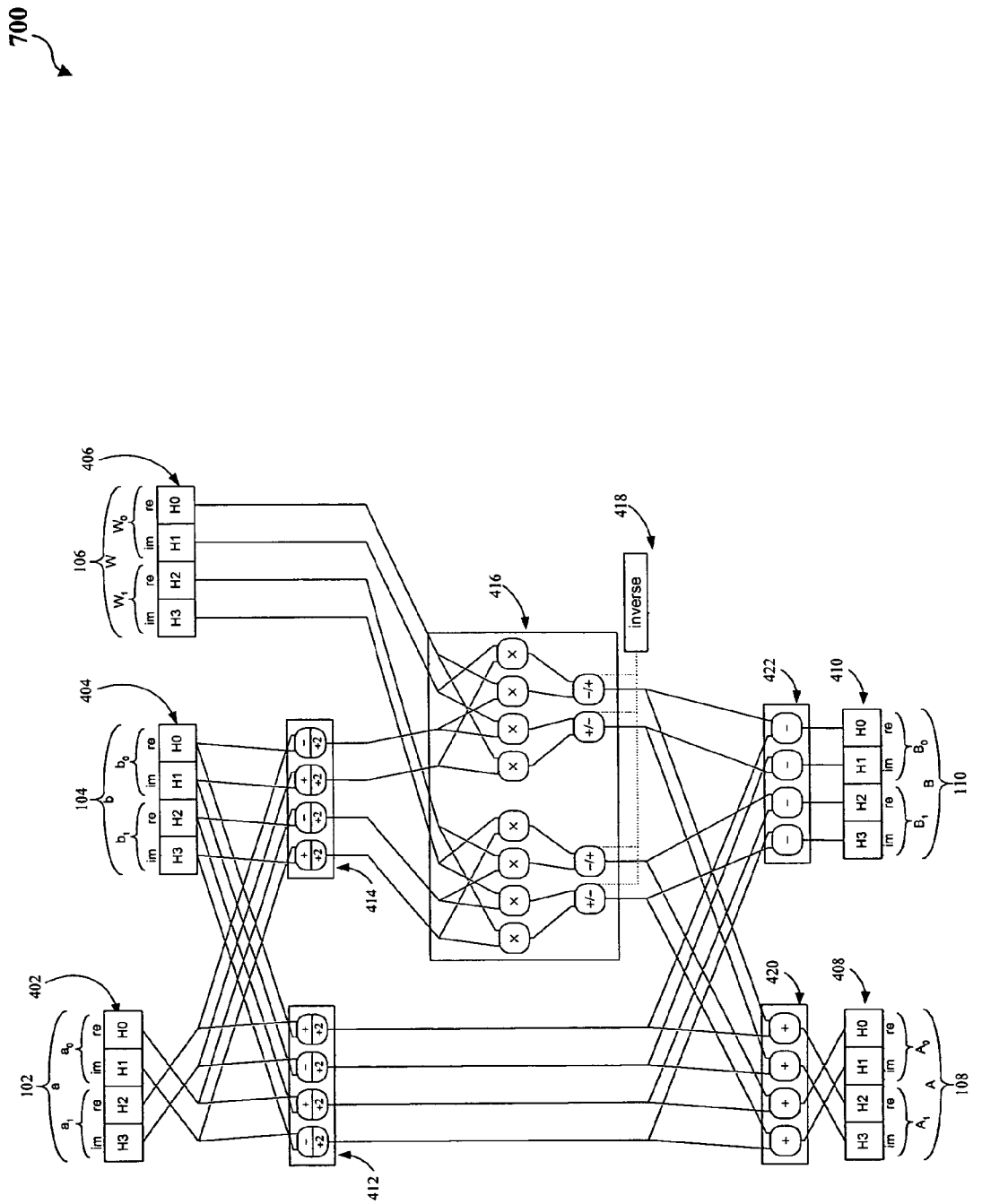
FIG. 7 illustrates data flow in the execution of a 2-way SIMD form of s a logical representation in detail of a 2-way SIMD FFT conversion operation.

In an embodiment of the present invention, a 2-way SIMD form of FFT conversion operation 100 is implemented. This is illustrated in FIG. 7. By comparison of FIG. 7 with FIG. 4, it will be seen that the same functional units of FFT conversion operation 100, required for the single instance of the FFT conversion operation shown in FIG. 4, are present in the 2-way SIMD form. These elements include the adder/subtracter unit 412, the subtracter/adder unit 414, the complex multiplier unit 416, the adder unit 420, and the subtracter unit 422. However each unit is now doubled in size and comprises two instances of its function rather than one. Also of note in FIG. 7 is the detail that the two complex input values which make up input operand 402 are reversed in order, so that they may be combined with the relevant complex values from input operand 404 and twiddle factor operand 406, as described above. Similarly, the output complex values which make up output operand 408 are also reversed in order, as described above.

With regard to software implementation of the FFT conversion stage as described above, (i.e., the conversion stage, at step 206 of FIG. 2 or at step 312 of FIG. 3, in using an N-point FFT to convert between 2N real points and N complex points), it should be noted that this stage of the forward or inverse FFT computation can be quite expensive, measured in terms of processor cycles. Relative to the cost of the main N-point FFT, using conventional methods of performing the conversion stage can represent a significant proportion of the cost, partly depending partly on the value of N: for smaller values of N, the cost of the conversion stage forms a greater proportion of the total cost of the FFT, as compared with larger values of N. In some cases, the cost of the conversion stage might be as high as a quarter or even a third of the total cost of the FFT, depending on implementation details. The conversion stage of the forward or inverse FFT can, therefore, represent a significant part of the total computational cost for a software-based DMT transmitter, receiver or modem, especially in the case where one processor handles the operations for multiple independent channels (e.g., in a multi-line DSL modem in a central office). This concern can be further complicated by an increasing pressure for greater integration and performance, and therefore, more channels to be handled per processor and/or larger-sized FFT operations. As a result, it is necessary to improve the efficiency of the extra FFT processing in such software-based DMT devices.

The FFT conversion instruction of the present invention addresses these concerns by reducing the number of cycles needed for software to perform a conversion operation (e.g., the conversion step "CVT_step" described in the above abstract function "CVT") used in the conversion stage of a forward or inverse FFT, and therefore enables an increase in efficiency of FFT computations. As described in greater detail below, the FFT conversion instruction processes a plurality of instances of a conversion operation (e.g., 2-way SIMD, 4-way SIMD, 8-way SIMD, etc.) over two sets of complex points at once. In the case of more than 2-way SIMD arrangements, the issue of the ordering of the individual complex values in the input and output operands, wherein the values in the a input 102 and the A output 108 are dealt with in reverse order compared to the order of values in the other operands, can be extended easily in an obvious manner. In an embodiment, control of the behavior of the FFT conversion instruction is by means of a separate control register that contains a control bit to select between forward and inverse FFT context. To determine the behavior of the conversion operation, the control register can be utilized to control an "inverse" signal 418. The contents of the control register, and thus the state of signal 418, can be altered by the programmer. In another embodiment, the behavior of the FFT conversion instruction is controlled by variant opcode. For example, one opcode present as part of the instruction format which identifies an FFT conversion instruction can cause that the FFT conversion instruction to perform a conversion suitable for use in a forward FFT computation (by generating a suitable value for "inverse" signal 418), and another different opcode can cause the instruction to perform a conversion operation suitable for an inverse FFT computation, but generating an alternative value for "inverse" signal 418.

The FFT conversion instruction of the present invention can be used in, for example and without limitation, a processor in a chip or chip-set implementing the central-office modem (ATU-C) end or the remote modem (ATU-R) end of an ADSL link, or implementing a VDSL Transceiver Unit modem at either the optical network unit (VTU-O) end or the Remote site (VTU-R) end of a VDSL link. The FFT conversion instruction of the present invention can be used both in respect of the mechanism in a processor which implements it (such as in an execution unit of such a processor), and in software executed by such a processor. The FFT conversion instruction of the present invention might equally be used in other contexts where an FFT computation is to be performed (or where the FFT conversion operation is used), including systems not implementing DSL or DMT (discrete multi-tone) modulation and de-modulation.

A further embodiment of the FFT conversion instruction of the present invention will now be described, again with reference to FIG. 7. It is a 2-way SIMD form of the instruction, acting on fixed-point format data values. This embodiment of the present invention takes as input three 64-bit values. Two instances (a0, a1) of input complex value 102 are taken at the first input data operand 402. Input a0 includes 32-bits of data and input a1 includes 32 bits. Two instances (b0, b1) of input value 104 are taken at the second input data operand 404, with input b0 having 32-bits and input b1 having 32 bits. Finally, twiddle factor operand 406 takes two twiddle factor values (W0, W1) of twiddle factor 106, with twiddle factor value W0 having 32-bits and twiddle factor value W1 having 32 bits. Upon completion of execution of the FFT conversion instruction, output operands 408 and 410 receive the two 64-bit output operands representing output values A 108 and B 110, respectively, subdivided respectively into $A_0$ and $A_1$ in the case of output value A 108, and into $B_0$ and $B_1$ in the case of output value B 100. Output operand 408 includes two 16-bit real parts in fields H2 and H0, and two 16-bit imaginary parts in fields H3 and H1. Similarly, output operand 410 includes two 16-bit real parts in fields H2 and H0 and two 16-bit imaginary parts in fields H3 and H1.

The FFT conversion instruction in execution performs a complete conversion step (e.g., the conversion step "CVT_step" described in the above abstract function "CVT") for each of the 2 SIMD lanes of the input operands. The input values $(a_1, b_0, W_0)$ form one set of input values to convert, producing outputs $A_1$ and $B_0$. The input values $(a_0, b_1, W_1)$ form the other set, producing outputs $A_0$ and $B_1$.

The embodiment of the FFT conversion operation 100 of the present invention herein described uses fixed-point arithmetic and treats the scalar parts of its complex operands as fixed point numbers. An alternative embodiment could use other forms of representation of the values being manipulated, including but not limited to floating-point representations, and would therefore use other types of arithmetic in performing calculations upon them, for example floating-point arithmetic. In the embodiment herein described, the 16-bit component fields of the input data operands 402 and 404 are considered as simple 2's complement integers, and the 16-bit component fields of the twiddle factor operand 406 are treated as 2's complement fixed-point fractions with 1 (sign) bit to the left of the binary point and 15 bits of fraction to the right. This is appropriate because any twiddle factor value W in the FFT is defined to have a scalar magnitude of 1, hence neither component of a twiddle factor value W can exceed the range [−1 . . . +1]. In fact, there is a minor compromise to the range for positive components, that the maximum value which can be represented is actually 32767/32768 (i.e., 0.999969482 . . . ) rather than exactly 1.0. In practice, this limitation is not of great significance in most cases.

In an embodiment, the FFT conversion instruction of the present invention is implemented such that (typically using pipelining in the processor) a new instance of the FFT conversion instruction can be initiated (if so programmed in software) on every processor cycle. By comparison, the equivalent operations on a processor not having the capability to execute the FFT conversion instruction of the present invention would typically cost eight cycles or more. Therefore, the FFT conversion instruction of the present invention reduces the cost of the conversion process (e.g., the conversion step "CVT_step" described in the above abstract function "CVT") for a more efficient FFT execution.

An example implementation of the present invention is provided below in Function A, which includes pseudo code for the FFT conversion instruction of the present invention. The exemplary FFT conversion instruction is called "BFLYCH", which is short for ButterFLY Conversion on Halfwords; however the choice of name or mnemonic here is incidental and any name could be used. (The use of the term Butterfly relates to the "FFT butterfly" operation which is a commonly used operation in implementing the main stages of the FFT as at step 209 of flowchart 200 or step 309 of flowchart 300. The FFT butterfly operation is described by Proakis, J. G. & Manolakis, D. G. in *Digital Signal Processing*, New York, Maxwell Macmillan, 1992, Chapter 9, ISBN 0-02-946378, incorporated herein by reference. The structure of the FFT conversion operation of the present invention has some similarity to the structure of FFT butterfly operation (but also several differences), hence the use of this name.) Instruction BFLYCH can be invoked for execution on a SIMD processor (adapted to execute the FFT conversion instruction of the present invention) by using an instruction line of the form:

BFLYCH aA, bB, W

As described above with reference to FIGS. 1-7, the FFT conversion instruction of the present invention nominally includes five operands (i.e., input data operand 402, input data operand 404, twiddle factor operand 406, output operand 408, and output operand 410). However, instruction BFLYCH is specified with three 64-bit operands, aA, bB, and W. Of these, aA and bB function as both inputs and outputs, while W is purely an input The operation performed by instruction BFLYCH takes the original values of aA and bB as its two complex data inputs (i.e., input values a 102 and b 104, each comprising two complex values for a and two complex values for b), and the value of W as its twiddle factor input (i.e. twiddle factor values W0 and W1 forming twiddle factor 106). Upon completion, two 64-bit result operands (i.e. 408 and 410, representing output values A 108 and B 110, each comprised of two complex values) are written back to aA and bB, replacing the original values in those operands. An additional source of values used in the execution of instruction BFLYCH is a control register. In Function A (below), the variable BSR (which stands for the incidental name "Butterfly Status Register") refers to the control register which contains a control bit called "Inverse", which allows the FFT direction (forward or inverse) to be controlled. The control value of BSR.Inverse could alternatively be derived from use of variant opcodes as described above.

The instruction's behavior, including the effect of the control bit (or variant opcode) for the control signal BSR.Inverse, is described by the following pseudo code represented in Function A, in which "sN", "dN", "sum", "diff", "DiffR", "ResultA", and "ResultB" are internal temporary values:

FUNCTION A:

sN=AVRSH (aA, bB)

dN=DVRSH (aA, bB)

sum.H0=sN.H0 sum.H1=dN.H1 sum.H2=sN.H2 sum.H3=dN.H3 diff.H0=dN.H0 diff.H1=sN.H1 diff.H2=dN.H2 diff.H3=sN.H3

DiffR=COMPMUL(diff, W)

ResultA.H0=SSH(RNE15(ADDX(SHL15(Sum.H$_2$), DiffR-X$_2$)))

ResultA.H1=SSH(RNE15(ADDX(DiffR.X$_3$, SHL15 (Sum.H$_3$))))

ResultA.H2=SSH(RNE15(ADDX(SHL15(Sum.H$_0$), DiffR.X$_0$)))

ResultA.H3=SSH(RNE15(ADDX(DiffR.X$_1$, SHL15 (Sum.H$_1$))))

ResultB.H0=SSH(RNE15(SUBX(SHL15(Sum.H$_0$), DiffR.X$_0$)))

ResultB.H1=SSH(RNE15(SUBX(DiffR.X$_1$, SHL15 (Sum.H$_1$))))

ResultB.H2=SSH(RNE15(SUBX(SHL15 (Sum.H$_2$), Diff.X$_2$)))

ResultB.H3=SSH(RNE15(SUBX(Diff.X$_3$, SHL15 (Sum.H$_3$))))

aA=ResultA bB=ResultB

The various sub-functions used above are now defined.

SSH(v) is defined to accept a 19-bit signed integer value v and return a 16-bit signed integer result determined by the value of v as:

SSH(v)=−32768, v<−32768;

SSH(v)=+32767, v>+32767;

SSH(v)=v, otherwise.

SHL15(v) performs a left-shift of 15 places and sign-extension by two bits of the signed integer value v to create a 33-bit signed integer result, as follows:

result.<14 . . . 0>=0 result.<30 . . . 15>=v.<15 . . . 0> result.<31>=v.15 result.<32>=v.15

RNE15(v) rounds v to an integer form. It is defined as treating v as a signed 2's complement fixed-point value with 15 bits of fractional part. It returns the signed integer part of the value only, discarding the least significant 15 bits, and rounding the result in accordance with the value of the fractional part, such that the result is rounded to the nearest integer to v. If the fractional part represents 0.5 exactly (either upper or lower integer is equally near), then the result is chosen as the nearest even integer to v.

ADDX(a, b) computes in 2's complement arithmetic the sum (a+b), where a and b are both 33-bit signed integer values and the result is a 34-bit signed integer value. Overflow is not possible.

SUBX(a, b) computes in 2's complement arithmetic the difference (a−b), where a and b are both 33-bit signed integer values and the result is a 34-bit value. Overflow is not possible.

AVRSH(x, y) performs a 4-way SIMD averaging operation across the four 16-bit lanes of 64-bit operands x and y, with each 16-bit lane considered as a 2's complement number in the range [−32768 . . . +32767]. Each of its four 16-bit output lanes, out.H$_i$ (i=0 . . . 3) is produced from the corresponding lanes of x and y as:

$$out.H_i=(x.H_i+y.H_i)/2$$

DVRSH(x, y) performs a 4-way SIMD divergence operation across the four 16-bit lanes of 64-bit operands x and y, with each 16-bit lane considered as a 2's complement number in the range [−32768 . . . +32767]. Each of its four 16-bit output lanes, out.H$_i$ (i=0 . . . 3) is produced from the corresponding lanes of x and y as:

$$out.H_i=(x.H_i-y.H_i)/2$$

COMPMUL(x, y) performs a 2-way SIMD complex multiplication operation across the two 32-bit complex lanes of its x and y operands, further controlled by the 1-bit inverse control bit in the BSR. The input data for each of x and y is further subdivided into two pairs of 16-bit lanes (real part in less significant position, imaginary part in more significant position), or simply as four 16-bit lanes numbered [0 . . . 3] where lane 0 is the least significant and lane 3 the most significant. Each 16-bit lane is considered as a signed 2's complement number. The operation is defined to return a 132-bit result, considered as two 66-bit complex values (i.e., pairs of 33-bit lanes) or just as four 33-bit lanes. The output of COMPMUL in the latter view is defined to be four 33-bit lanes out.X$_i$ (i=0 . . . 3) as follows:

```
if (BSR.Inverse) {
    out.X_0 = x.H_0 * y.H_0 + x.H_1 * y.H_1
    out.X_1 = x.H_1 * y.H_0 - x.H_0 * y.H_1
    out.X_2 = x.H_2 * y.H_2 + x.H_3 * y.H_3
    out.X_3 = x.H_3 * y.H_2 - x.H_2 * y.H_3
} else {
    out.X_0 = x.H_0 * y.H_0 - x.H_1 * y.H_1
    out.X_1 = x.H_1 * y.H_0 + x.H_0 * y.H_1
    out.X_2 = x.H_2 * y.H_2 - x.H_3 * y.H_3
    out.X_3 = x.H_3 * y.H_2 + x.H_2 * y.H_3
}
```

For purposes of definition here, all the 16-bit lanes of both x and y operands are considered as signed integers with no fractional part, although logically the BFLYCH instruction's W operand is comprised of 16-bit lanes whose effect is as if they were fixed-point values with 15-bits of fractional part. The change of representation is effected by the use of the RNE15 function in the top-level instruction definition.

In the above definitions, the following notation conventions are used:

val.n where n is an integer constant, means bit n of value val, where bit 0 is the least significant bit and bit 1 is the next more significant bit, etc.

val.{i,j,k, ... } where i,j,k, ... are integer constants, is a shorthand way of writing val.i, val.j, val.k, ...

val.<m ... n> where m and n are integer constants and m>n, means the linear bit sequence (val.m, val.(m−1), ... val.n) considered as an ordered composite multi-bit entity where val.m is the most significant bit and val.n the least significant bit of the sequence val.$H_0$ is equivalent to val.<15 ... 0> val.$H_1$ is equivalent to val.<31 ... 16> val.$H_2$ is equivalent to val.<47 ... 32> val.$H_3$ is equivalent to val.<63 ... 48> val.$X_0$ is equivalent to val.<32 ... 0> val.$X_1$ is equivalent to val.<65 ... 33> val.$X_2$ is equivalent to val.<98 ... 66> val.$X_3$ is equivalent to val.<131 ... 99>

FIGS. 1-7 are conceptual illustrations useful for explaining the present invention. For example, the present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention.

It should be understood that aspects of the present invention (including these functional building blocks) could be implemented in hardware, firmware, software, or a combination thereof. In such an embodiment, the various components and steps (or portions thereof) would be implemented in hardware, firmware, and/or software to perform the functions of the present invention. That is, the same piece of hardware, firmware, or module of software could perform one or more of the illustrated blocks (i.e., components or steps).

In this document, the terms "computer program medium" and "computer usable medium" are used to generally refer to media such as a removable storage unit, a hard disk installed in hard disk drive, and signals (i.e., electronic, electromagnetic, optical, or other types of signals capable of being received by a communications interface). These computer program products are means for providing software to a computer system. The invention, in an embodiment, is directed to such computer program products.

In an embodiment where aspects of the present invention is implemented using software, the software can be stored in a computer program product and loaded into computer system using a removable storage drive, hard drive, or communications interface. The control logic (software), when executed by a processor, causes the processor to perform the functions of the invention as described herein.

In another embodiment, aspects of the present invention are implemented primarily in hardware using, for example, hardware components such as application specific integrated circuits (ASICs). Implementation of the hardware state machine so as to perform the functions described herein will be apparent to one skilled in the relevant art(s).

In yet another embodiment, the invention is implemented using a combination of both hardware and software.

While various embodiments of the present invention have been described above, it should be understood that they have been presented by way of example, and not limitation. It will be apparent to one skilled in the relevant art(s) that various changes in form and detail can be made therein without departing from the spirit and scope of the invention. Moreover, it should be understood that the method, system, and computer program product of the present invention could be implemented with any type of communications device including, but not limited to, cable modems, set-top boxes, headends, communication gateways, switches, routers, Internet access facilities, servers, personal computers, enhanced telephones, personal digital assistants (PDA), televisions, or the like. Thus, the present invention should not be limited by any of the above-described exemplary embodiments, but should be defined only in accordance with the following claims and their equivalents.

What is claimed is:

1. A system for performing an FFT between frequency-domain data and time-domain data, comprising:
    operation means for detecting a control message for selecting between a forward FFT and an inverse FFT; and
    transform means for executing one or more instances of an FFT conversion instruction to perform an FFT conversion stage of the FFT, wherein the FFT includes,
        an inverse portion that, when executed, performs said inverse FFT on a plurality of complex frequency-domain data that is in a standard form to produce complex time-domain data, the inverse portion comprising conversion means for converting said standard form of said plurality of complex frequency-domain data to a modified form, and
        a forward portion that, when executed, performs said forward FFT on complex time-domain data to produce a plurality of complex frequency-domain data.

2. The system of claim 1, further comprising interleaving means for interleaving real and imaginary data values from said complex time-domain data to produce an array of real time-domain data.

3. The system of claim 1, further comprising extracting means for extracting real and imaginary data values from an array of real time-domain data to produce said complex time-domain data.

4. The system of claim 1, wherein said operation means comprises a control register, wherein a control bit specifies said control message.

5. The system of claim 1 wherein said operation means comprises an opcode, wherein said opcode specifies said control message.

6. The system of claim 1 wherein said operation means comprises an inverse flag, wherein said inverse flag specifies said control message.

7. A system for performing an FFT between frequency-domain data and time-domain data, comprising:
   operation means for detecting a control message for selecting between a forward FFT and an inverse FFT; and
   transform means for executing one or more instances of an FFT conversion instruction to perform an FFT conversion stage of the FFT, wherein the FFT includes,
      an inverse portion that, when executed, performs said inverse FFT on a plurality of complex frequency-domain data to produce complex time-domain data, and
      a forward portion that, when executed, performs said forward FFT on complex time-domain data that has been converted to a modified form to produce a plurality of complex-frequency-domain data, the forward portion comprising conversion means for converting said modified complex frequency-domain data in said modified form to a standard form of said plurality of complex-frequency-domain data.

8. The system of claim 7, further comprising interleaving means for interleaving real and imaginary data values from said complex time-domain data to produce an array of real time-domain data.

9. The system of claim 7, further comprising extracting means for extracting real and imaginary data values from an array of real time-domain data to produce said complex time-domain data.

10. The system of claim 7, wherein said operation means comprises a control register, wherein a control bit specifies said control message.

11. The system of claim 7, wherein said operation means comprises an opcode, wherein said opcode specifies said control message.

12. The system of claim 7, wherein said operation means comprises an inverse flag, wherein said inverse flag specifies said control message.

13. A system for performing a Fast Fourier Transform (FFT), comprising:
    a control register that includes a control bit for selecting between a forward FFT and an inverse FFT; and
    a processor that executes one or more instances of an FFT conversion instruction to perform an FFT conversion stage of the FFT, wherein the FFT includes,
       an inverse portion that, when executed, performs said inverse FFT on a plurality of complex frequency-domain data in a modified form to produce complex time-domain data, and
       a forward portion that, when executed, performs said forward FFT on complex time-domain data to produce a plurality of complex frequency-domain data,
       and that, if said inversion portion is executed, converts said plurality of complex frequency-domain data from a standard form to said modified form.

14. The system of claim 13, wherein the processor interleaves real and imaginary data values from said complex time-domain data to produce an array of real time-domain data.

15. The system of claim 13, wherein the processor extracts real and imaginary data values from an array of real time-domain data to produce said complex time-domain data.

16. A system for performing a Fast Fourier Transform (FFT), comprising:
    a control register that includes a control bit for selecting between a forward FFT and an inverse FFT; and
    a processor that executes one or more instances of an FFT conversion instruction to perform an FFT conversion stage of the FFT, wherein the FFT includes,
       an inverse portion that, when executed, performs said inverse FFT on a plurality of complex frequency-domain data in a modified form to produce complex time-domain data, and
       a forward portion that, when executed, performs said forward FFT on complex time-domain data to produce a plurality of complex frequency-domain data,
       and that, if said forward portion is executed, converts said plurality of complex frequency-domain data from said modified form to a standard form.

17. The system of claim 16, wherein the processor interleaves real and imaginary data values from said complex time-domain data to produce an array of real time-domain data.

18. The system of claim 16, wherein the processor extracts real and imaginary data values from an array of real time-domain data to produce said complex time-domain data.

* * * * *